United States Patent
Bushin (10) Patent No.: US 9,288,284 B2
(45) Date of Patent: Mar. 15, 2016

(54) MANAGED EVENT QUEUE FOR INDEPENDENT CLIENTS

(71) Applicant: Bsquare Corporation, Bellevue, WA (US)

(72) Inventor: Vladimir Bushin, Excelsior, MN (US)

(73) Assignee: Bsquare Corporation, Bellevue, WA (US)

( * ) Notice: Subject to any disclaimer, the term of this patent is extended or adjusted under 35 U.S.C. 154(b) by 227 days.

(21) Appl. No.: 13/770,850

(22) Filed: Feb. 19, 2013

(65) Prior Publication Data

US 2013/0218941 A1    Aug. 22, 2013

Related U.S. Application Data

(60) Provisional application No. 61/600,560, filed on Feb. 17, 2012.

(51) Int. Cl.
*H04L 29/06* (2006.01)
*G06Q 10/10* (2012.01)
*H04L 29/08* (2006.01)

(52) U.S. Cl.
CPC .............. *H04L 67/42* (2013.01); *G06Q 10/10* (2013.01); *H04L 67/325* (2013.01)

(58) Field of Classification Search
CPC ....... H04L 67/42; H04L 67/325; H04L 29/06; H04L 69/329; H04L 67/2833; H04L 67/2895; G06Q 10/10
USPC ................................................. 709/201, 204
See application file for complete search history.

(56) References Cited

U.S. PATENT DOCUMENTS

| | | | |
|---|---|---|---|
| 8,275,816 B1* | 9/2012 | Pegg | 707/829 |
| 8,484,291 B1* | 7/2013 | Topolcic et al. | 709/205 |
| 2004/0003104 A1* | 1/2004 | Boskovic et al. | 709/231 |
| 2004/0064430 A1* | 4/2004 | Klein et al. | 707/1 |
| 2004/0177108 A1 | 9/2004 | Connelly et al. | |
| 2004/0181577 A1* | 9/2004 | Skurikhin et al. | 709/204 |
| 2004/0184470 A1 | 9/2004 | Holden | |
| 2004/0218592 A1 | 11/2004 | Nagar et al. | |
| 2005/0164793 A1* | 7/2005 | Merimovich et al. | 463/42 |
| 2006/0036722 A1 | 2/2006 | Larkin et al. | |
| 2007/0156834 A1* | 7/2007 | Nikolov et al. | 709/207 |
| 2008/0126441 A1 | 5/2008 | Giampaolo et al. | |
| 2013/0148504 A1* | 6/2013 | Ungureanu | 370/235 |

OTHER PUBLICATIONS

International Search Report and Written Opinion for PCT/US13/26732 filed Feb. 19, 2013, mailed Apr. 30, 2013, 10 pages.

\* cited by examiner

*Primary Examiner* — Joon H Hwang
*Assistant Examiner* — Abdulkader M Alriyashi
(74) *Attorney, Agent, or Firm* — Perkins Coie LLP (57) ABSTRACT

Technology for serving events to a plurality of client computing devices is disclosed. In some embodiments, the technology implements a queue containing a set of elements comprising one or more NULL components; and a list of events, each event corresponding to one or more client updates received from the associated client computing devices. The technology associates pointers in the queue with client computing devices for processing updates, and uses the pointers to determine whether or not to send particular updates to particular clients, thereby preventing some clients from slowing down update processing for all clients.

16 Claims, 6 Drawing Sheets

MANAGED EVENT QUEUE FOR INDEPENDENT CLIENTS

CROSS-REFERENCE TO RELATED APPLICATION(S)

This patent application claims the benefit of U.S. Provisional Patent Application Ser. No. 61/600,560, entitled MANAGED EVENT QUEUE FOR INDEPENDENT CLIENTS and filed on Feb. 17, 2012, the disclosure of which is incorporated herein in its entirety by reference.

BACKGROUND

Because of the widespread adoption of computer networking technologies, client computing devices are increasingly interconnected, e.g., with server computing devices. As more applications are implemented as collaborative, multi-user, or multi-player, servers must coordinate sending nearly simultaneous updates to multiple clients, each with varying processing power and using various network capabilities. As the demand on servers from this multitude of heterogeneous clients grows, servers' ability to provide timely service has decreased.

One prior art approach to serving multi-client application updates to the connected clients involves synchronously sending data to all connected clients so that the next update is sent when each client has acknowledged the current update. Another approach is to duplicate sets of update data for faster versus slower clients. These approaches produce numerous drawbacks. Synchronously sending updates to multiple clients requires that even though a faster client has acknowledged an update and is ready to receive the next update, the faster client must wait until a slower client has also acknowledged the update. This can result in unnecessary lag for the faster client and buildup on the server of pending updates. Duplicating data for fast clients does not introduce dependence based lag, but ties up valuable server resources and processing power as duplicate data is created and maintained.

DETAILED DESCRIPTION

Technology is disclosed for managing event information at a server computing device ("server") and serving event information to client computing devices ("client") ("the technology"). In various embodiments, a server or an associated device generates and/or transmits updates for a plurality of client computing devices. As examples, the server may transmit updates from an application that shares a user interface or other information with multiple clients. The server may receive the updates and implement an event queue for multiple connected client computing devices. A queue on the server may be logically implemented as a first-in-first-out (FIFO) queue or may be programmed as a linked list or indeed other suitable data structures as would be known by persons having ordinary skill in the art. The queue may store a set of elements comprising one or more NULL objects and an ordered list of events. Each event in the queue may correspond to a client update message, e.g., from an application connected to client computing devices. The events in the queue may be sequentially organized such that newer events are closer to the head of the queue and older elements are closer to the tail of the queue. Older events may be "aware" of newer events through, e.g., by using a next event pointer configured to point to the next newer element in the queue. When the application issues a new update, the corresponding event may be added to the head of the queue, with a next event pointer pointing to the new event from the previous head event.

The server may further associate a client pointer with each connected client computing device. It will be understood to persons having ordinary skill in the art that while a server may be in communication with multiple computing devices, a connected client computing device, as used herein, refers to a client computing device subscribing to updates from the server. The client pointers may be controlled by a single execution thread or separate threads. The server may assign each client pointer to point to an event in the queue corresponding to the newest event that has not been received by the client computing device associated with the client pointer. If the associated client computing device has received the most recent event in the queue, the server may assign a NULL value to that client pointer.

The server may determine that an update should be transmitted to an updateable client computing device. This may be accomplished by, e.g., cycling through the client pointers or their corresponding threads, polling client computing devices, or waiting for a ready message or delivery confirmation from client computing devices. The server uses a selected pointer, which is the client pointer assigned to the updateable client computing device, to determine which update event, if any, should be transmitted to the updateable client computing device. The update event is then transmitted to the updateable client computing device. In some embodiments, the server then updates the selected pointer to point to the event indicated by the selected event's next event pointer, or to NULL if there is no newer event in the queue. In some embodiments, the selected pointer is not updated until the selected client computing device has acknowledged receipt of the event. If none of the event pointers point to either the selected event or an older event, then the selected event and any older events have been served to all the connected client computing devices, so the server may then delete the selected event and/or any older events.

In some embodiments, events can take one of at least two forms: display events and control events. Display events may fall into two categories: display update events and display full screen events. Display update events are messages to a client computing device to change a portion of the display based on a previous screen representation; conversely, display full screen events are messages containing a representation of a full screen image, e.g. a bitmap image, which does not rely on a previous screen state.

If a slow client computing device is unable to keep up with faster client computing devices, the queue may become too long or events may become stale. In various embodiments, described in more detail below in relation to FIG. 6, a number of update events may be replaced with a consolidated event, e.g., a display full screen event. When display events are consolidated, control events may be maintained in the same order in relation to each other.

By implementing a single queue of events with client pointers corresponding to each client computing device, the technology may not suffer from slow client computing devices becoming bottlenecks for other client computing devices. Furthermore, the technology may not require excessive duplication of data.

As used herein, servers, clients, or other associated devices may implement an application or other services that generate updates for a plurality of client computing devices. As known by persons having ordinary skill in the art, such multi-client applications include, but are not limited to, remote environments, multi-player games, applications implementing collaborative input, and shared file and shared data applications. As further known by persons having ordinary skill in the art, examples of update events include, but are not limited to, display update events, display full screen events, data messages, and control messages.

Figure 1:
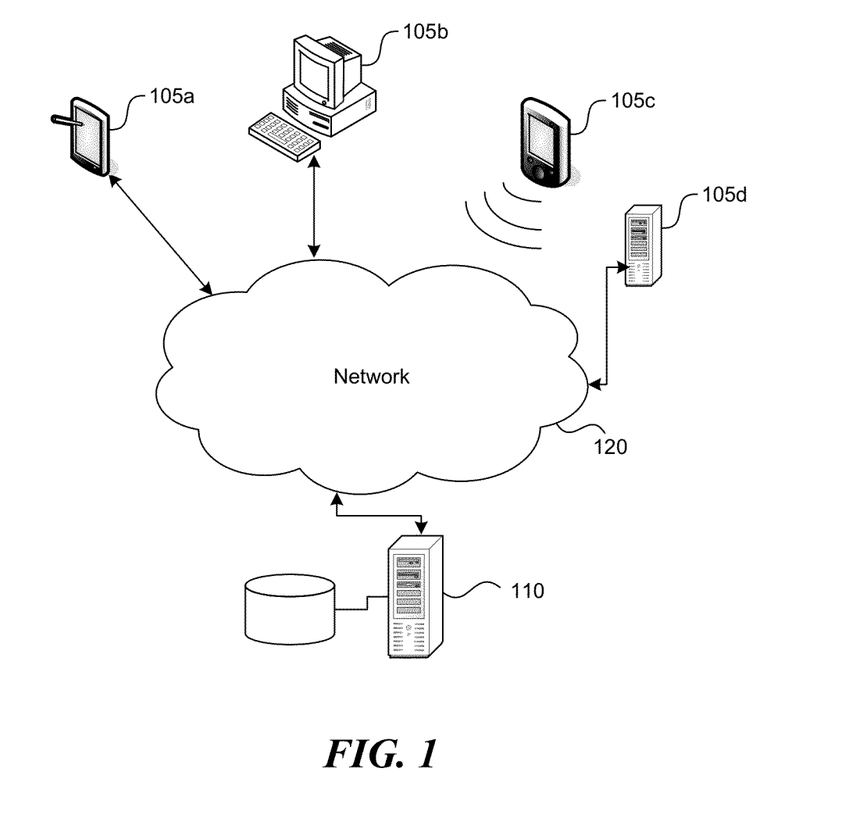
FIG. 1 is a block diagram illustrating an overview of an environment and devices on which some embodiments of the current application may operate.

FIG. 1 is a block diagram illustrating an overview of an environment and devices on which some embodiments of the current technology may operate. A system for implementing the technology may include one or more client computing devices 105A-D. Components of each client computing device 105A-D and server 110 may include, but are not limited to, a processing unit, a system memory, a storage unit, a network interface or adapter, a display, and an input device. One or more client computing devices 105A-D may be referred to herein as client computing device 105.

The client computing devices 105a-d, and/or server computing device 110 may include a variety of computer-readable storage media, e.g., a magnetic storage device, flash drive, RAM, ROM, tape drive, disk, CD, or DVD. Computer-readable media can be any available storage media and include both volatile and nonvolatile media and removable and non-removable media.

Client computing device 105 and server 110 may operate in a networked environment using logical connections to one or more remote computing devices through network 120. Server computing device 110 may be a dedicated server, a personal computer, mobile device, embedded device, or any other computing device capable of serving data to a client computing device. In some embodiments, a device may act as both a client computing device and server computing device. Network 120 can be a local area network (LAN) or a wide area network (WAN), but may also be other wired or wireless networks. The client computing device 105 and server 110 may be connected to network 120 through a network interface, such as by a wired or wireless network.

The technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Figure 2:
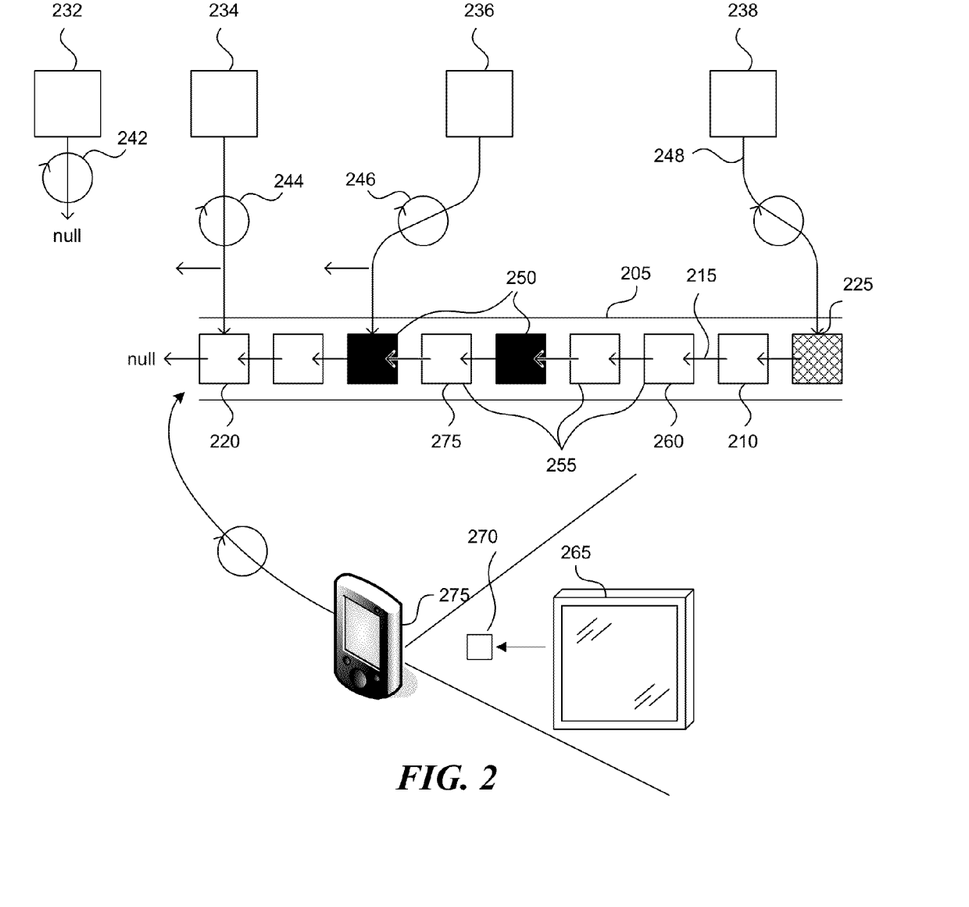
FIG. 2 is a block diagram illustrating an embodiment for independent delivery of device updates to multiple clients with a single queue.

FIG. 2 is a block diagram illustrating an embodiment for independent delivery of device updates to multiple clients with a single queue. Block 205 represents a queue of events implemented by server computing device 110 for application 265. It will be understood by persons having ordinary skill in the art that the elements referred to as events in the queue may comprise the actual data for the events or indicators (e.g., pointers) for other processes to access the data for the events.

In some embodiments, the queue is implemented as a linked list. Although the following description uses linked lists, other data structures can be equally used. Block 220 is at the head of the linked list and represents the newest event in the queue, while block 225, at the tail of the queue, represents the oldest event in the queue. Each event in the queue may comprise a client update. Each event may also have a next event pointer pointing to the next newer event in the queue. Event 210, for example, has pointer 215, which points to a more recent event 260. As application 265 generates a new event 270, it may be placed at the head of the queue 205 with the next event pointer for event 270 pointing to NULL. The next event pointer of the previous head of the list, event 220, may be updated to point at the new head of the list, event 270. New events added to the queue may include other information, such as a time stamp, size of the event, type of event, special instructions, or other information related to queue maintenance and event serving.

As client computing devices 105 connect to server computing device 110 to receive updates from application 265, each client computing device may be assigned a client pointer 232-238. Client pointers 232-238 may point at events in the queue corresponding to the next update to be sent to the client computing device assigned to the client pointer. In various embodiments, pointers may be initialized to point to NULL, the head of the queue, the tail of the queue, or at a particular event within the queue such as the oldest control event, the newest display full screen event, etc. In some embodiments, each pointer 232-238 may be operated by separate threads 242-248. In some embodiments, one or more of the threads 232-238 are operated by a single thread.

As discussed in more detail below in relation to FIG. 5, the server computing device 110 may determine that a client computing device is ready to receive an event. Server computing device 110 may then retrieve the event pointed to by the pointer associated with that client computing device. For example, if the server determines that the client computing device associated with client pointer 238 is ready, the server computing device 110 may retrieve event 225 to be sent to the client computing device associated with pointer 238. After an event is sent to a client computing device, the client pointer associated with that client computing device may need to be updated. In some embodiments, client pointer updating may be triggered by sending the event to the client. In some embodiments, updating the client pointer may be triggered by a message from the client computing device indicating the event was received or processed. A client pointer is updated by retrieving the next event pointer for that client pointer's event, and configuring the client pointer to point to the same event as that next event pointer.

When the server computing device 110 has sent all available events to a client, the client pointer associated with that client computing device may be configured to point to NULL, as shown by client pointer 232 in FIG. 2, or to some other ready-state object. When a new event 270 is added to the queue, client pointers pointing to NULL or a ready-state object, such as client pointer 232, may be configured to point to the new event 270.

If a single client, such as the client computing device associated with pointer 238, becomes "stuck" or falls behind other client computing devices, this may not noticeably affect service to the other client computing devices because their corresponding pointers advance independently.

Events that have been served to each of the connected client computing devices may be removed. An event that is "behind" all the client pointers in the queue has been served to all the connected client computing devices and so can be removed. In FIG. 2, the right-most box event 225 represents a screen event pointed by the client pointer 238. When event 225 is served to the client associated with client pointer 238, and client pointer is updated to point at event 210, there will be no pointers pointing to events at or behind event 225. A pointer in this condition is "forgotten." At this point forgotten event 225, may be removed from the queue, e.g., by moving it to a garbage. Similarly if the connection to the client associated with pointer 238 is dropped, client pointer 238 may be removed. If this occurs, the events in the queue between and including event 225 and 275 are behind any client pointer; these events may also go to the garbage.

In some embodiments, the application serving events to the queue, the old target, may be disconnected and a new application, a new target, is connected. The queue on the server may be detached from the old target, the queue may be cleaned up (i.e. all the client pointers become 'free'), and the new target is assigned. Event from the new target may be subsequently added to the queue.

In some embodiments, queue 205 is a queue of events for a virtual screen 265 visible at computing device 275 distinct from server 110. The virtual screen 265 may be replicated on display devices at client computing devices 105. The virtual screen 265 may generate control events 250, display update events 255, and display full screen events 225. A control event may be a notification of a change of state of the server computing device. For example, this may entail a device connection, disconnection, or a notification of a screen consolidation, as discussed below. As the virtual screen sends display update events 255 and display full screen events 225 events to server 110, the virtual screen application may copy the information from an internal buffer (cache) into the event object, thereby preventing problems arising from object in use errors. When event updates from computing device 275 are inserted into queue 205 at server 110, a timestamp of their arrival may be checked so that screens do not arrive out of order. If a screen event is received out of order it may be ignored.

In some embodiments, each update may be a display full screen event. In this case, if a race condition happens on the server in the virtual screen application, updates that come out of order may be ignored.

Figure 3:
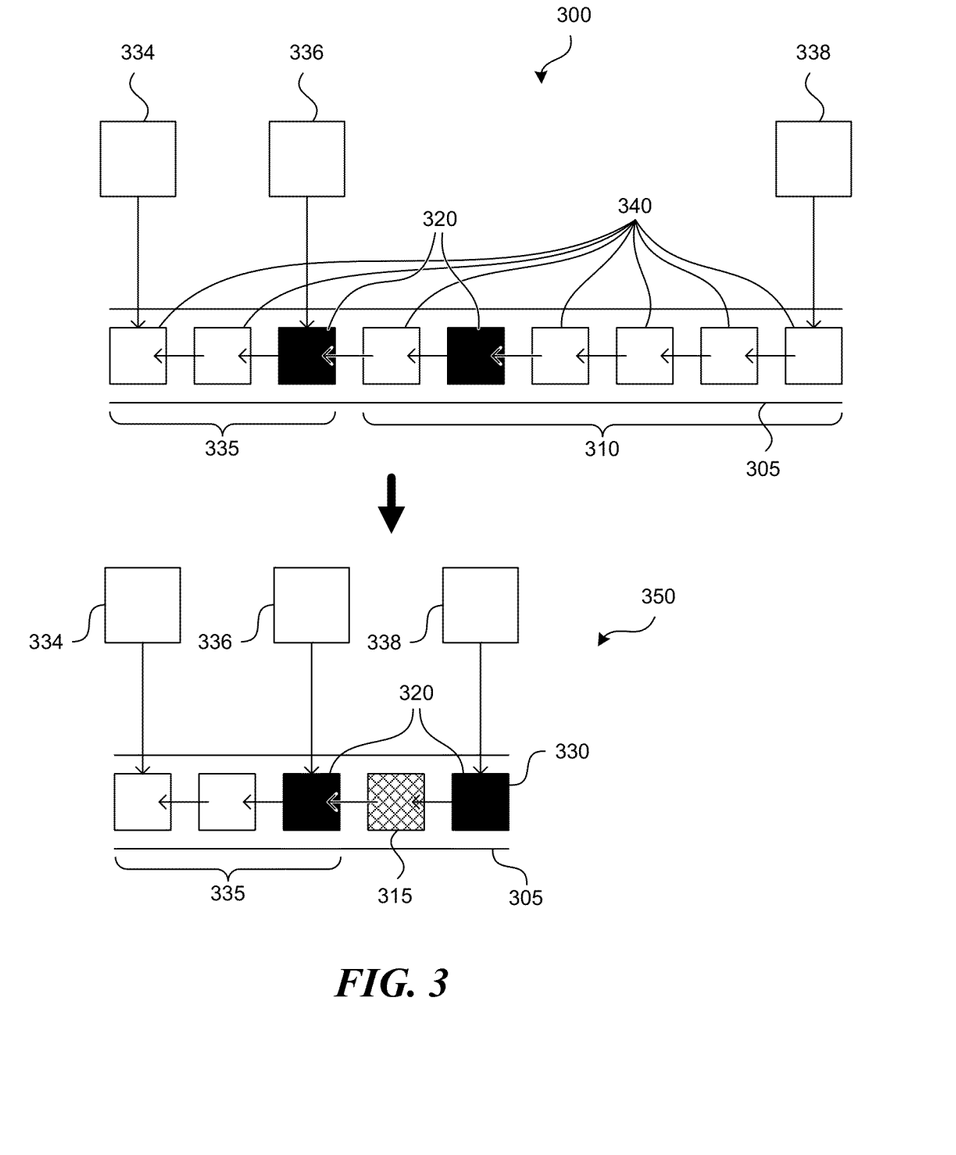
FIG. 3 is a block diagram illustrating an embodiment for consolidation of display events.

FIG. 3 is a block diagram illustrating an embodiment for consolidation of display events. Server computing device 110 may determine that a number of events in the queue should be consolidated. Box 300 shows a state of the queue before consolidation. Box 350 shows a state of the queue after consolidation. This may be due to the overall size of the queue, the number of events in the queue, the age of one or more events in the queue, an efficiency determination, or other factors. For example, when a new event is enqueued, the whole queue may be measured for its weight, count, or age. If it is too "heavy" (e.g., the total size elements in the queue is too large), too numerous, or too old, then a consolidation may be triggered.

When there are numerous events which are getting old and may no longer reflect the actual state of the update data, it may be more efficient to calculate and replace all events over a certain age, e.g. older than 5 seconds, with a single event encompassing multiple other events. Numerous small events may be consolidated into a single consolidated event which is smaller than the sum of the smaller update events. The consolidated event may encompass the effect of the smaller updates by calculating the effect of the smaller updates as a single effect, or it may encompass the smaller updates by creating an event indicating the current state of a data element from a time at or later than the newest event to be consolidated.

For example, in a queue where events are control events 320, display update events 340, and display full screen event 315, when a client 338 cannot catch up with the growing queue 305, the amount of memory spent to keep all the display update events in a consolidation zone 310 could be larger than amount of memory required for a single display full screen event. In this case, it may be beneficial to replace all the display update events in the consolidation zone 310 with a single display full screen event 315. The display update events in the consolidation zone 310 could be removed from the queue 305 and replaced by a single display full screen event 315. The display full screen event 315 may encompass the display updates by capturing the current state of the screen.

The control messages 320, whether in the consolidation zone or not, may stay in queue 305 in the sequence they were added to the queue. The display full screen event 315 may be added at the point in the queue immediately closer to the head of the queue after the consolidation zone 310, but before any control messages not consolidated from the consolidation zone 310. Any of the client pointers 332-338 that pointed to consolidated events may be repositioned to point to the oldest control message from the consolidation zone if one exists; otherwise, it may be configured to point to the display full screen event 315. A timestamp may be added to the consolidated display full screen event 315 so that display events after the display full screen event 315, which may be older than the display full screen event 315, are not sent to client computing devices after the display full screen event 315 has been sent.

As illustrated in FIG. 3, the first 3 events are in protected zone 335. Events in the protected zone 335 may not be eligible for consolidation. This prevents a possible jerkiness associated with full screen updates for client computing devices that are fast enough to have their associated client pointers, such as 334 and 336, close to the head of the queue. As client pointer 338 enters the protected zone 335, it may have just consumed a display full screen event 315 which is newer than some of the display update events in the protected zone 335. These display update events may be ignored by client pointer 338.

In some embodiments, after a consolidation occurs, the server may send a special event to one or more affected clients indicating a consolidation has occurred. This event tells the client that they may have missed something, rather than only consolidating behind the scenes.

In some embodiments, when the consolidation condition occurs, server 110 may return an error and throw away one or more events from the queue instead of creating a consolidation event. In various embodiments, the error may trigger an increase to the maximum size of cached data, or a message to a client regarding a performance issue.

The settings for queue service and consolidation may be configurable in various embodiments. Configuration options may allow managing the limits of memory used and the amount of information preserved on server and client side. In some embodiments, configuration options include a Normal Operation Threshold, a Max Queue Age Threshold, and a Max Queue Weight Threshold. The Normal Operation Threshold defines the number of events in the protected zone, i.e. the number of events from the head of the queue that should not be consolidated. A default value for the Normal Operation Threshold may be 3. The Max Queue Age Threshold defines the age at which the oldest event in queue triggers a consolidation. A default value may be 2 seconds. The Max Queue Weight Threshold defines the amount of memory taken up by the queue which triggers a consolidation. A default value may be 40 Mb.

Figure 4:
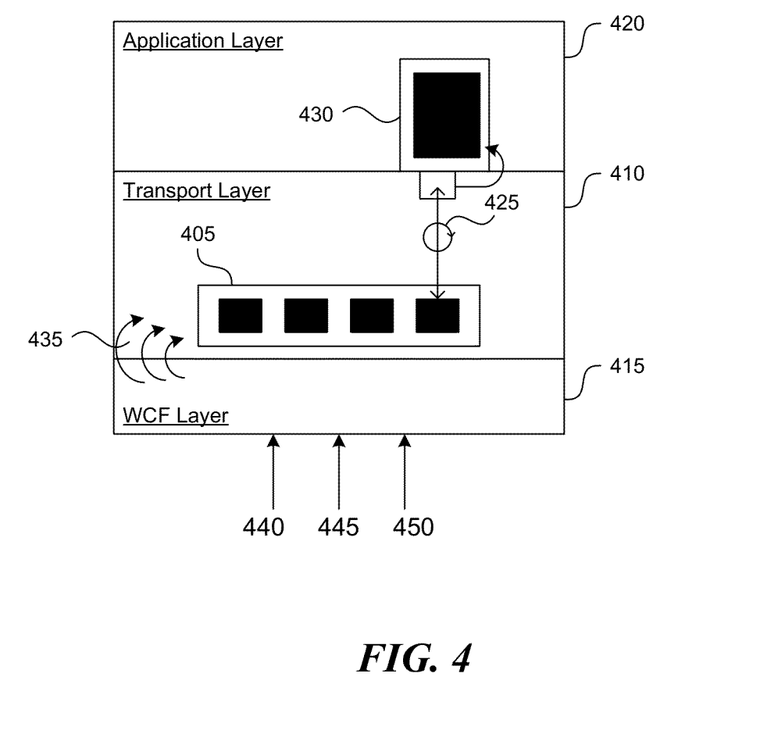
FIG. 4 is a block diagram illustrating an embodiment for event queuing at a client device.

FIG. 4 is a block diagram illustrating an embodiment for event queuing at a client device. The client computing devices 105 may implement a client queue 405 to buffer received events 440-450 and delay their processing so that events that are delivered out of order may be processed in order. The client queue 405 may be a first-in-first-out queue. The client queue 405 may be implemented at the network transport layer 410 to receive events from the lower Windows Communication Foundation ("WCF") layer 415 and serve events to the higher application layer 420. The client queue 405 may be consumed by a separate thread 425. The thread 425 that consumes events from the client queue may take an event and try to access a UI component 430 via Invoke( ). If the UI component 430 is available it will apply the update and indicate to the server that the client device is ready for a new event. When a new update is implemented on the client computing device, the Invoke( )method of any UI component may be used to ensure the implementation procedure is working on the UI thread. When Invoke( ) is called, the component that calls it is marshaling parameters. Therefore, the update UI element, such as a Bitmap that is getting painted, may not be used for the Invoke( ) call. Otherwise the update UI element may be used by two threads. For example, one thread may use a bitmap as an element to paint to the display, using properties in the code protected by lock( ) while another thread attempts to use the bitmap for the Invoke( ) and marshaling.

If too many events are delivered to the client, client queue 405 may overflow. This situation may be avoided if event delivery from the server is either sufficiently delayed or throttled to synchronize event delivery with client consumption. This may be accomplished by checking every time a new update is about to be inserted in the client queue 405 the count, age or weight of the client queue 405. If a checked value is larger than a threshold condition, new events are not inserted until the client 405 falls below the threshold condition. When a new event is not inserted in the client queue 405 because a checked value is below a threshold condition, the client delivery thread may sleep. If the delivery thread sleeps long enough a SendTimeout condition of the WCF binding may be exceeded and the call from server to client fails, resulting in the client computing device being disconnected.

In some embodiments, if throttling is applied after receiving an event, the number of events that the current client queue 405 can contain is decreased by one. This in turn decreases the number of messages, causing the server to wait longer to deliver the next event. In this embodiment, if throttling is not applied after receiving an event, the number of possible events in client queue 405 increases by one. A similar approach is taken in an embodiment where the age of the updates exceeds an age threshold. In this embodiment new events are not inserted unless the client queue age decreases below the threshold.

If the concurrency mode in WCF is set to "Single" or "Reentrant" only one thread can make a call and one thread can make a callback. With these settings, if a client UI thread performs a callback to the server computing device, the client UI thread waits for a completion of event service before performing a callback. Meanwhile the client computing device may receive an event occupying the client UI thread. The client UI thread may not be able to return from a WCF call. This may result in a deadlock if the callback thread attempts to insert an event into the client UI and calls Invoke( ). In some embodiments the deadlock may be avoided by setting the concurrency mode of the WCF to "Multiple" such that any number of threads are allowed.

In a case where a client callback thread is not synchronous with the server, or there is no queue on the client computing device, the update events may be incorrectly inserted in random order. In some embodiments this is resolved by having separate event threads on the server computing device, synchronous transfer of messages from the server computing device to the client computing device, and implementing a queue on the client computing device with a single thread that inserts updates in order as they were inserted in queue.

The settings for client queue service and consolidation may be configurable in various embodiments. Configuration options may allow managing the limits of memory used and the amount of information preserved on server and client side. In various embodiments, configuration options include Max Queue Age Threshold, Normal Queue Age, Event Count Threshold, Event Count Normal, or Max Queue Weight. The Max Queue Age Threshold defines a difference in age between the oldest event in queue and the latest event that arrived but has not yet been inserted in the client queue. This may be used to control when throttling should start. A default value may be 3 seconds. The Normal Queue Age defines a second difference in age between the oldest event in queue and the latest event that arrived but has not been inserted in the client queue. This may be used to control when throttling should end. A default value may be 1. The Event Count Threshold defines a number of events in the queue that triggers throttling. A default value may be 5. The Event Count Normal defines a number of events in the queue to stop throttling. A default value may be 1. The Max Queue Weight defines a size for the queue which triggers throttling until the queue drops below this size. A default value may be 10 Mb.

Those skilled in the art will appreciate that the logic illustrated in FIGS. 1-4 and described above, and in each of the flow diagrams discussed below, may be altered in a variety of ways. For example, the order of the logic may be rearranged, substeps may be performed in parallel, illustrated logic may be omitted, other logic may be included, etc.

Figure 5:
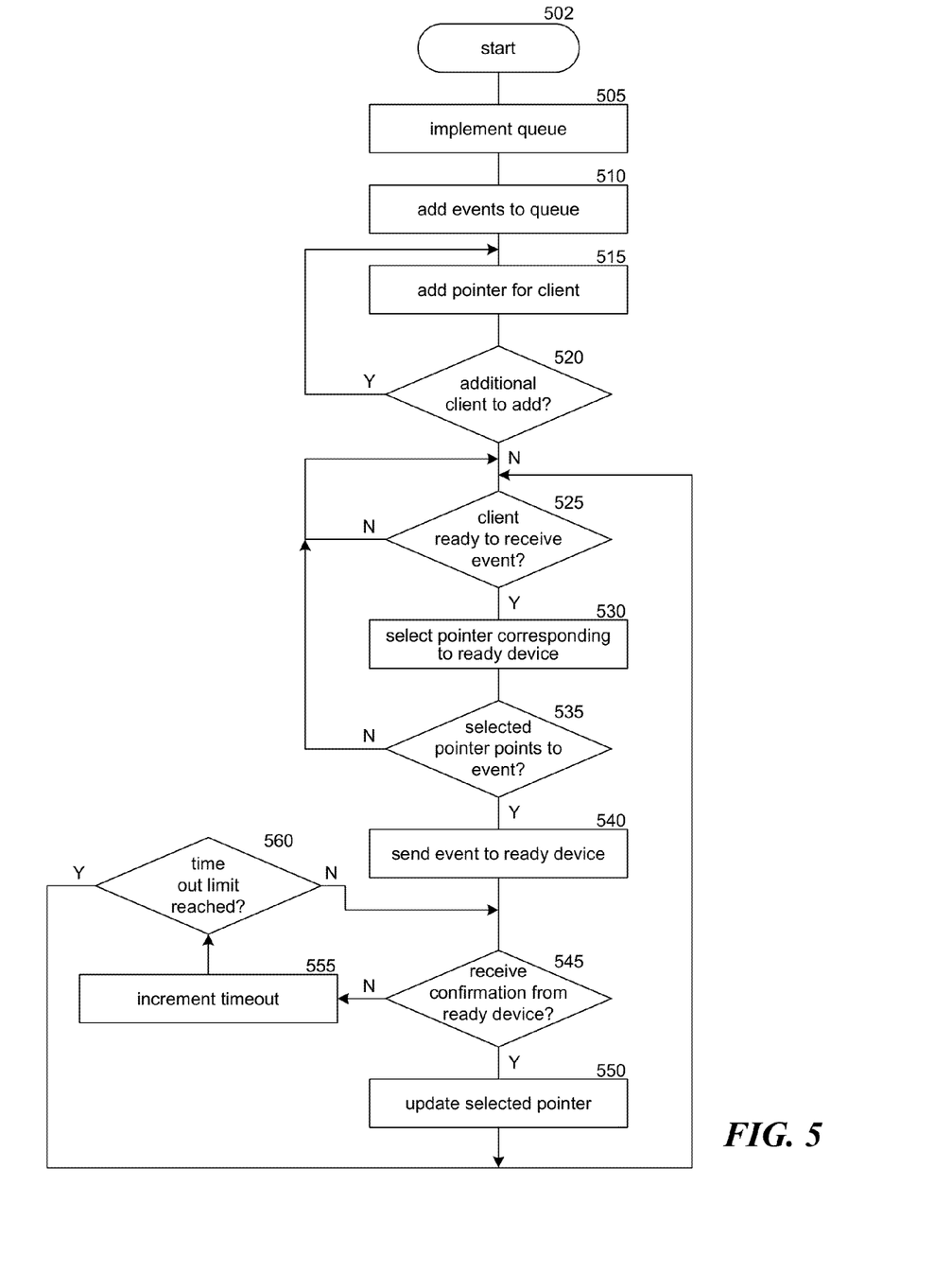
FIG. 5 is a flow diagram illustrating a routine invoked by the technology in various embodiments to create and use a single queue to serve events to multiple clients.

FIG. 5 is a flow diagram illustrating a routine invoked by the technology in various embodiments to create and use a single queue to serve events to multiple clients. The routine begins at block 502. At block 505 a server computing device 110 implements a queue, such as queue 205. The queue 205 may be implemented as a linked list, stack, array, or other data structure. At block 510 the server computing device 110 receives events, such as events 225, 250, and 255. These events may be added to the queue 205 in sequential order. In some embodiments the events are wrapped in containers within the queue 205. In some embodiments, the events are stored outside the queue 205 and referenced with indicators stored sequentially in the queue 205. In some embodiments, the queue 205 is implemented as a linked list, where older event indicators, such as event 210, each have a pointer, such as a pointer 215, to the next newest event indicator 260, in the queue 205.

At block 515, server computing device 110 determines a connected client computing device 105 which does not have a pointer into queue 205. Server computing device 110 creates a pointer, such as pointer 232, for the determined client computing device. This may also include initializing a unique thread 242 to operate pointer 232. Pointer 232 may be initialized to point to NULL, the head 220 of the queue 205, the tail 225 of the queue 205, the newest display full screen event 225 in the queue 205, or another event in queue 205. At block 520 the server computing device 110 determines if any additional connected clients do not have a pointer into queue 205. If so the process returns to block 515, if not the process goes on to block 525.

At block 525 server computing device 110 determines if one of the connected client computing devices, such as the client computing device for client pointer 238, is ready to receive an event. If so, the process continues to block 530; if not, the process waits until a client computing device is ready to receive an event. This process may include cycling through various threads operating pointers, receiving a response from a client computing device, determining that a new event is available for a client previously determined ready but with no available events, or by other means of looping through client pointers or activating triggers to serve events.

At block 530 server computing device 110 selects the pointer, such as pointer 238, corresponding to the device determined ready to receive an event in block 525. At block 535 server computing device 110 determines whether the selected pointer points to an event, such as event 225. If so, processing continues at block 540; if the selected pointer points to NULL or some other non-event object, processing continues at block 225.

At block 540, the event 225 pointed to by the selected pointer is sent to the determined client computing device. This may be accomplished by a main program thread or a secondary thread, such as thread 248. Processing then continues to block 545.

At block 545, the server computing device 110 determines whether a confirmation for the sent event has been received. If so, the process continues to block 550. If not, the timeout timer is incremented at block 555. If a threshold for the timeout timer is reached in block 560, the process continues to block 525; otherwise, the process continues to wait for a response at block 545. The timer may be expressly implemented or may be a process of a protocol layer, such as the WCF layer. If the timeout limit is reached at block 560, additional actions may be taken by the server computing device, such as disconnecting the client computing device, which may trigger further queue cleanup.

At block 550, the pointer for the selected event is updated to point to the next event in the queue. In some linked list embodiments, this may be accomplished by having the selected pointer point to the event pointed to by the selected event's next event pointer. The process then continues to block 525 to serve another event.

As discussed above in relation to FIG. 2, as events are served from the event queue 205 to client devices 105, additional events may be added to the head of the event queue 205. As also discussed above in relation to FIG. 2, events that have been served to all the connected client computing devices 105, and therefore cannot be reached by any client pointers, go to the garbage. As referenced herein, when an event is "forgotten," goes to the garbage, is removed, or deleted from the queue, this may be done explicitly, or by a platform or background component such as the Microsoft.net® or Java® garbage collector.

Figure 6:
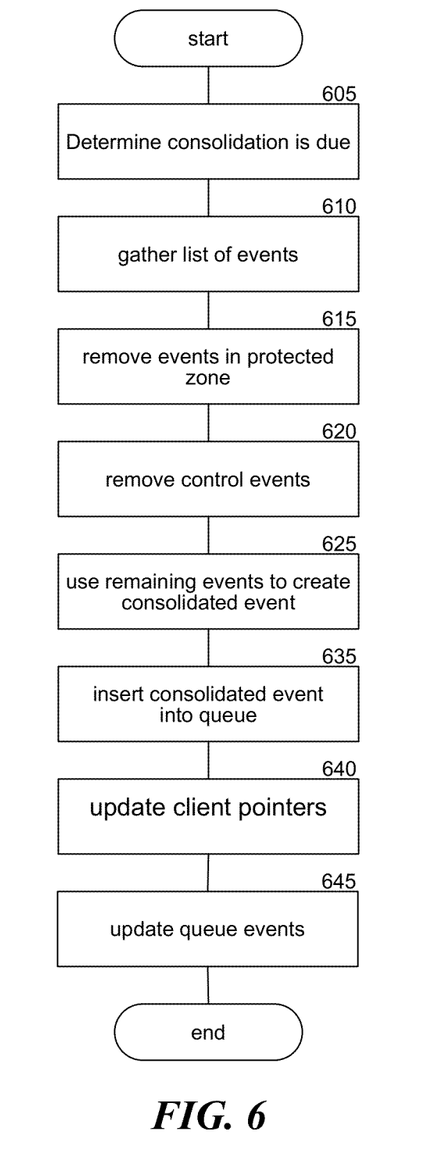
FIG. 6 is a flow diagram illustrating a routine invoked by the technology in various embodiments to consolidate display events.

FIG. 6 is a flow diagram illustrating a routine invoked by the technology in various embodiments to consolidate display events. At block 605 server computing device 110 determines that a consolidation should occur. In some embodiments, this determination may be reached by checking the overall size of the queue against a queue size threshold value. In some embodiments, this determination may be made when the number of events in the queue reaches a queue event limit threshold value. In some embodiments, this determination may be made when the age of one or more events in the queue reach an age threshold value. In some embodiments, this determination may be made when server computing device 110 determines that the efficiency of consolidating two or more events outweighs the cost and possible loss of performance for performing a consolidation. For example, when a new event is queued, the whole queue may be measured for its weight, count, or age. If it is too heavy, too numerous, or too old then a consolidation may be triggered. Furthermore, various events within the queue may be analyzed to determine that it is more efficient to combine them and serve an event encompassing their result than keeping the individual events in the queue. The process then continues to block 610.

At block 610, server computing device 110 gathers a list of two or more consolidation events. As discussed above, this may be based on their age, size, location in the queue, type, or a determination that consolidating these events will be efficient. For example, if the basis for determining that a consolidation is due is that the 20 events in the queue exceed a 15 event threshold, the list of events may be, e.g., the 5 or more events at the tail of the queue, the last 5 or more display events in the queue, the 5 or more largest events in the queue, the 5 or more oldest events in the queue, some combination of these in a different particular region of the queue, or some other collection of events. In some embodiments the list of consolidation events comprises all the display events or the display events outside a protected zone. Processing then continues to block 615.

At block 615, in some embodiments, a portion of the queue has been determined to be a protected zone. As discussed above, events in the protected zone may not be eligible for consolidation. This prevents a possible jerkiness associated with consolidated events for client computing devices that are fast enough to have their associated client pointers close to the head of the queue. If events in the protected zone have been included in the consolidation event list from block 610, they are removed from the consolidation event list at block 615. Processing then continues to block 620.

At block 620, in some embodiments, events may comprise control events. Control events may not be eligible for consolidation. In this embodiment, if control events have been included in the consolidation event list from block 610, they are removed from the list at block 620. Processing then continues to block 625.

At block 625, server computing device 110 creates a consolidated event to encompass the events on the consolidation event list. In some embodiments, the consolidated event may encompass the effect of the events on the consolidation event list by calculating the total effect of these events and creating a corresponding single effect event. In some embodiments, the consolidated event may encompass the events on the consolidation event list by creating an update event indicating the current state of a data element from a time of or later than the newest event on the consolidation event list. For example, in a queue containing display update events, it may be beneficial to replace a set of the display update events with a single display full screen event. The selected display update events may be removed from the queue and replaced by a single display full screen event. The display full screen event may encompass the display updates by capturing the current state of the screen, even though the display full screen event encompasses additional data beyond the consolidated events. Processing then continues to block 635.

At block 635, the consolidation event is associated with events in the queue. In some embodiments the consolidation event stays outside the queue as a separate object with a next event pointer pointing back to an event in the queue. Client pointers may be assigned to point at the consolidation event outside the queue. When the consolidation event is served to a client and a confirmation is received, the corresponding client pointer may then be updated to point at a next object in the queue. Alternatively, in some embodiments, there is a protected zone in the queue and the consolidation event may be placed immediately before the protected zone. In some embodiments, the consolidation event may be placed at the location of the last removed event. In some embodiments the consolidation event may be placed after the location of the last removed event and also after any subsequent control events. Processing then continues to block 640.

At block 640, server computing device updates client pointers that were previously pointing to events on the consolidation event list. These client pointers may be updated to point to the next event closer to the head of the queue that is now in the queue. For example, a client pointer may be updated to point to the next control event past the display event it was previously pointing to or the client pointer may be updated to point to the new consolidation event.

At block 645, events that are closer to the tail of the queue than the client pointer that points furthest back in the queue may go to the garbage.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method performed by a server computing system for managing an event queue for different client computing systems associated with the server computing system, comprising:
   implementing, using a processor, a queue containing a set of elements, the set of elements comprising a list of at least two events, wherein:
      at least a first of the at least two events is a display event indicating one or more visual changes indicated by one or more of the client computing systems; and
      at least a second of the at least two events is a control event indicating a change of state of the server computing system relating to administration of the queue, wherein the control event is initiated by the server;
   assigning a pointer associated with a first client computing device to point to a first element of the queue;
   assigning a pointer associated with a second client computing device to point to a second element of the queue;
   selecting an updatable client computing device from the first client computing device and the second client computing device based on a determination that the updateable client computing device is available to receive an update event;
   selecting, using the processor, the update event from the queue based on the pointer associated with the updatable client computing device pointing to the update event;
   transmitting the update event to the updateable client computing device;
   assigning the pointer associated with the updatable client computing device to point to a subsequent element in the queue;
   choosing two or more events in the queue that will be consolidated, wherein the choosing includes excluding, from the two or more events in the queue that will be consolidated, any control events;
   creating a consolidated event encompassing the two or more chosen events;
   incorporating the consolidated event into an ordering of the list of at least two events;
   selecting a set of updatable pointers by determining whether any of the two or more pointers points to one of the two or more events chosen to be consolidated; and
   updating the set of updatable pointers by configuring each of the updatable pointers to point to either the consolidated event or another event in the queue which is not any of the two or more events chosen to be consolidated.

2. The method of claim 1 further comprising, prior to choosing the two or more events in the queue that will be consolidated, determining the queue will be consolidated based on the queue reaching a certain threshold of elements, the queue utilizing a certain threshold amount of memory, or that at least one of the two or more events in the queue is older than a certain threshold age.

3. The method of claim 1 wherein creating a consolidated event comprises creating a display full screen event.

4. The method of claim 1 further comprising:
   dividing the list of at least two events in the queue into a protected zone and a non-protected zone, the protected zone comprising a specified number of elements at a head of the queue, and the non-protected zone comprising the other elements in the queue;
   wherein choosing the two or more events excludes events in the protected zone.

5. The method of claim 4 wherein dividing the list of events into a protected zone and a non-protected zone is independent of sizes of the events.

6. The method of claim 1 wherein:
   in a condition where there is a subsequent event in the queue closer to a head of the queue than the update event, the subsequent element in the queue is the subsequent event in the queue; and
   otherwise the subsequent element in the queue is a NULL component.

7. The method of claim 1 wherein the control event is one of: an indication of a device connection, an indication of a device disconnection, or an indication of a screen consolidation.

8. A system for managing an event queue for different client computing devices, comprising:
   a memory and one or more processors;
   a queue containing a set of elements, the set of elements comprising a list of events related to representations of a screen visible on the client computing devices, wherein at least one element of the set of elements is a control event indicating a change of state of a server computing system relating to administration of the queue, wherein the control event is initiated by the server;

a first pointer associated with a first client computing device and pointing to a first particular element of the queue;

a second pointer associated with a second client computing device and pointing to a second particular element of the queue;

an update engine configured to select an update event pointed to by a selected pointer that corresponds to an updateable client computing device that is available to receive the update event;

a transmitter configured to transmit the update event to the updateable client computing device;

a pointer allocator configured to assign the selected pointer to point to a subsequent element in the queue;

a consolidation determination engine configured to choose two or more events in the queue that will be consolidated, wherein the choosing includes excluding, from the two or more events in the queue that will be consolidated, any control events; and a consolidator configured to:
- create a consolidated event encompassing the two or more chosen events;
- incorporate the consolidated event into an ordering of the list of events;
- select a set of updatable pointers by determining whether any pointers points to one of the two or more events chosen to be consolidated; and
- updating the set of updatable pointers by configuring each of the updatable pointers to point to either the consolidated event or another event in the queue which is not any of the two or more events chosen to be consolidated.

9. The system of claim 8 further comprising a queue cleanup component configured to remove a forgotten element from queue when pointers associated with a client computing device neither point to the forgotten event, nor to any events closer than the forgotten event to the tail of the queue.

10. The system of claim 8 wherein the two or more events in the queue that will be consolidated are chosen by selecting a collection of elements from the queue based on one or more of event size, location in the queue, type, or a determination that consolidating these events will be efficient, without regard to whether any of the consolidated events are among the oldest elements in the queue.

11. The system of claim 8 wherein the two or more events in the queue that will be consolidated are chosen by selecting a collection of elements from the queue based on a size of at least one of the two or more events in the queue that will be consolidated.

12. A computer-readable storage medium, excluding a transitory propagating signal, storing instructions that, when executed by a computing system, cause the computing system to perform operations comprising:

implementing, using a processor, a queue containing a set of elements, the set of elements comprising a list of events related to representations of a screen visible on the client computing devices, wherein at least one element of the set of elements is a control event indicating a change of state of a server computing system relating to administration of the queue, wherein the control event is initiated by the server;

associating a first pointer with a first client computing device and pointing to a first particular element of the queue;

associating a second pointer with a second client computing device and pointing to a second particular element of the queue;

selecting, using the processor, an update event pointed to by a selected pointer that corresponds to an updateable client computing device that is available to receive the update event;

transmitting the update event to the updateable client computing device;

assigning the selected pointer to point to a subsequent element in the queue;

choosing two or more events in the queue that will be consolidated, wherein the choosing includes excluding, from the two or more events in the queue that will be consolidated, any control events;

creating a consolidated event encompassing the two or more chosen events;

incorporating the consolidated event into an ordering of the list of events;

selecting a set of updatable pointers by determining whether any pointers points to one of the two or more events chosen to be consolidated; and updating the set of updatable pointers by configuring each of the updatable pointers to point to either the consolidated event or another event in the queue which is not any of the two or more events chosen to be consolidated.

13. The computer-readable storage medium of claim 12 wherein:
- the list of events in the queue are divided into a protected zone and a non-protected zone, the protected zone comprising a number of elements at a head of the queue, and the non-protected zone comprising the other elements in the queue; and
- the chosen two or more events do not comprise an event in the protected zone.

14. The computer-readable storage medium of claim 12 wherein, prior to transmitting the update event to the updateable client, a sequence number is added to the update event.

15. The computer-readable storage medium of claim 12 wherein the operations further comprise removing, from the queue the two or more events chosen to be consolidated.

16. The computer-readable storage medium of claim 12 further storing instructions that, when executed by the computing system, cause the computing system to further perform operations comprising:

prior to assigning the selected pointer to point to a subsequent element in the queue, receiving a confirmation from selected client that the selected update event has been received.

* * * * *